US010282815B2

(12) United States Patent
Bai et al.

(10) Patent No.: US 10,282,815 B2
(45) Date of Patent: May 7, 2019

(54) ENVIRONMENTAL MAP GENERATION FROM A DIGITAL IMAGE

(71) Applicant: Adobe Inc., San Jose, CA (US)

(72) Inventors: Xue Bai, Seattle, WA (US); Elya Shechtman, Seattle, WA (US); Sylvain Philippe Paris, Jamaica Plain, MA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/377,875

(22) Filed: Dec. 13, 2016

(65) Prior Publication Data
US 2018/0122044 A1 May 3, 2018

Related U.S. Application Data

(60) Provisional application No. 62/414,453, filed on Oct. 28, 2016.

(51) Int. Cl.
G06T 3/20 (2006.01)
G06T 3/40 (2006.01)
G06T 7/60 (2017.01)
G06T 5/00 (2006.01)

(52) U.S. Cl.
CPC ............ G06T 3/20 (2013.01); G06T 3/40 (2013.01); G06T 5/005 (2013.01); G06T 7/60 (2013.01)

(58) Field of Classification Search
CPC .............. G06T 3/20; G06T 3/40; G06T 7/60

USPC ........................................................ 382/295
See application file for complete search history.

(56) References Cited

FOREIGN PATENT DOCUMENTS

CN 107169926 9/2017

OTHER PUBLICATIONS

Zwart, How to Extend the Canvas of a Photo, http://www.iheartfaces.com/2012/12/extending-canvas-in-photoshop/, web archive, pp. 1-12, Dec. 6, 2012.*

(Continued)

Primary Examiner — Daniel G Mariam
(74) Attorney, Agent, or Firm — Wolfe-SBMC

(57) ABSTRACT

Environmental map generation techniques and systems are described. A digital image is scaled to achieve a target aspect ratio using a content aware scaling technique. A canvas is generated that is dimensionally larger than the scaled digital image and the scaled digital image is inserted within the canvas thereby resulting in an unfilled portion of the canvas. An initially filled canvas is then generated by filling the unfilled portion using a content aware fill technique based on the inserted digital image. A plurality of polar coordinate canvases is formed by transforming original coordinates of the canvas into polar coordinates. The unfilled portions of the polar coordinate canvases are filled using a content-aware fill technique that is initialized based on the initially filled canvas. An environmental map of the digital image is generated by combining a plurality of original coordinate canvas portions formed from the polar coordinate canvases.

20 Claims, 17 Drawing Sheets

(56) References Cited

OTHER PUBLICATIONS

Smith, Using Content Aware Scale in Photoshop, https://www.macprovideo.com/hub/photoshop/using-content-aware--scale-in-photoshop, pp. 1-10, MacProvideo, Apr. 14, 2012.*
Avidan,"Seam Carving for Content-Aware Image Resizing", ACM Transactions on Graphics 2007, Jul. 2007, 9 pages.
Barnes, "PatchMatch: A Randomized Correspondence Algorithm for Structural Image Editing", ACM SIGGRAPH 2009 Papers (New Orleans, Louisiana, Aug. 3-7, 2009), Aug. 3, 2009, 10 pages.
"Combined Search and Examination Report", GB Application No. 1713590.6, dated Feb. 8, 2018, 9 pages.

* cited by examiner

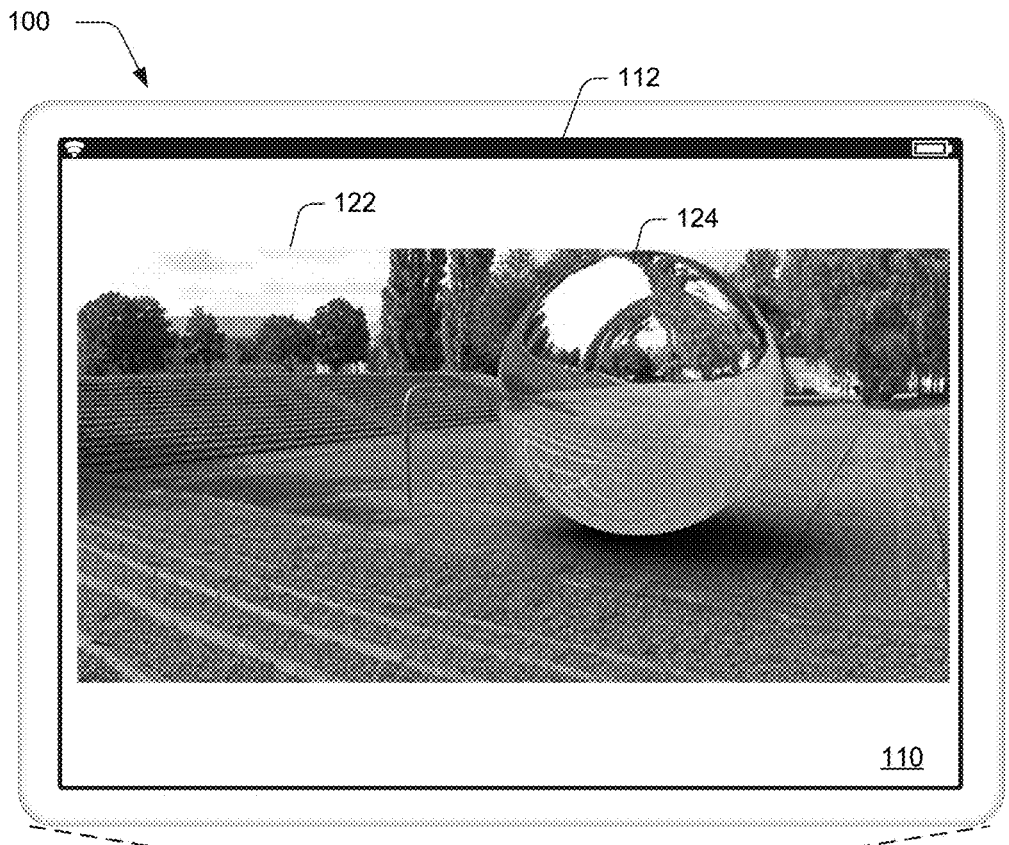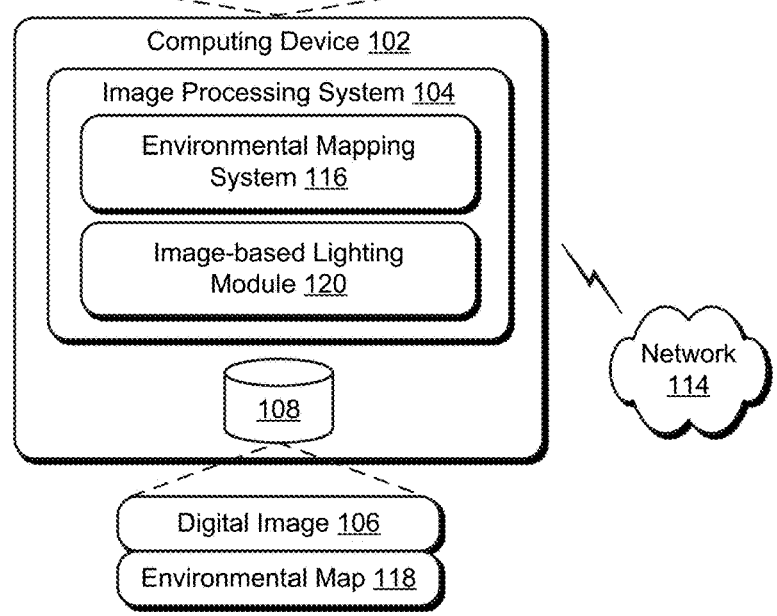
Fig. 1

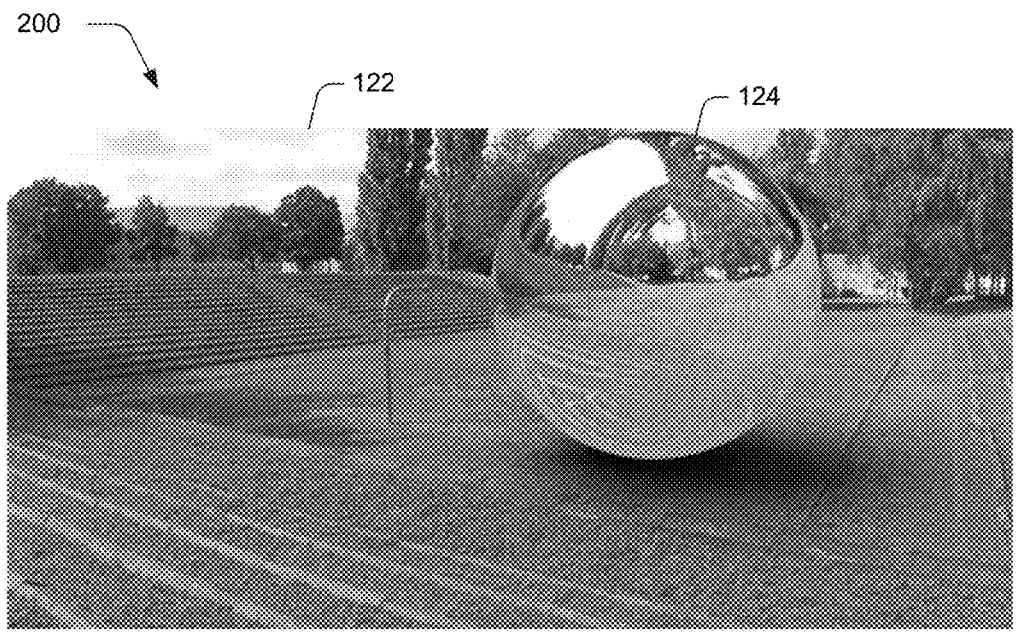
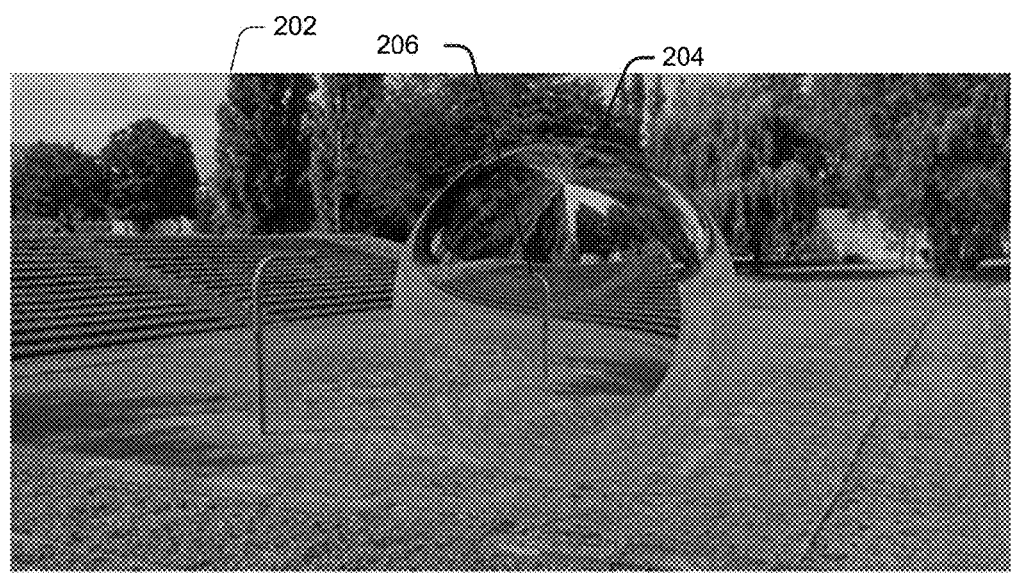
Fig. 2

1200

1202

ENVIRONMENTAL MAP GENERATION FROM A DIGITAL IMAGE

RELATED APPLICATIONS

This Application claims priority under 35 U.S.C. Section 119(e) to U.S. Provisional Application No. 62/414,453, filed Oct. 28, 2016, and titled "Environmental Map Generation from a Digital Image," the entire disclosure of which is hereby incorporated by reference.

BACKGROUND

An environmental map is an omnidirectional representation of light information encoded by a computing device as a 360-degree panoramic image. The environmental map is typically projected onto a sphere by the computing device and used to specify how light interacts within a digital image being mapped. As such, the environmental map may be used by a computing device to support a variety of image processing functionality. An example of this is to add objects to the digital image in a manner that appears realistic by employing the environmental map to determine effects of light within an environment of the digital image on the added object.

Conventional techniques used to form the environmental map, however, often lack accuracy. As a result, image processing techniques that rely on conventional environmental maps often fail for their intended purpose. For example, conventional techniques used to form an environmental map using arbitrary background images that have a field-of-view that is narrower than 360 degrees often result in noticeable artifacts and mismatches on left and right sides of the digital image.

SUMMARY

Environmental map generation techniques and systems are described. The described techniques may be used to generate an environment map from a digital image. To do so, an environmental mapping system is implemented at least partially in hardware of a computing device to generate the environmental map from the digital image based on content aware scaling and/or content aware fill.

A digital image is received as an input by an environmental mapping system. The environmental mapping system scales the input image to have a target aspect ratio, e.g., a two to one aspect ratio, width to height. This may be performed using a content aware scaling technique that is configured to minimize scaling of salient (i.e., identified as important) objects within the image by creating or reducing space in the digital image between these objects.

A canvas is also generated by the environmental mapping system that is dimensionally larger than the digital image. The digital image is inserted by the environmental mapping system at a center of the canvas, which creates an unfilled portion of the canvas that surrounds the inserted image. This unfilled portion of the canvas is then filled by the environmental mapping system. In one example, the filling is performed by reflecting (i.e., mirroring) the digital image in the horizontal direction and using a content aware fill technique to fill vertical portions of the canvas. This creates an initially filled version of the canvas.

A plurality of polar coordinate canvases is also generated from the canvas by the environmental mapping system. This is performed by transforming original coordinates (e.g., x/y coordinates) of the digital image into polar coordinates. Unfilled portions of the plurality of polar coordinate canvases are then also filled using a content aware fill technique by the environmental mapping system. In this instance, however, this content aware fill technique is initialized using the initially filled version of the canvas. The plurality of polar coordinate canvases, as filled, are then used to form a plurality of original coordinate canvas portions by the environmental mapping system. The environmental map is then formed by combining the original coordinate canvas portions as a 360-degree panoramic image to represent an effect of light within an environment of a digital image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 1 is an illustration of a digital medium environment in an example implementation that is operable to employ environmental map generation techniques described herein.

FIG. 2 depicts an example implementation showing an output of a digital image as including an object based on the environmental map generated by an environmental mapping system of FIG. 1 as contrasted with an output of a digital image including an object based on conventional environmental mapping techniques.

DETAILED DESCRIPTION

Overview

Figure 3:
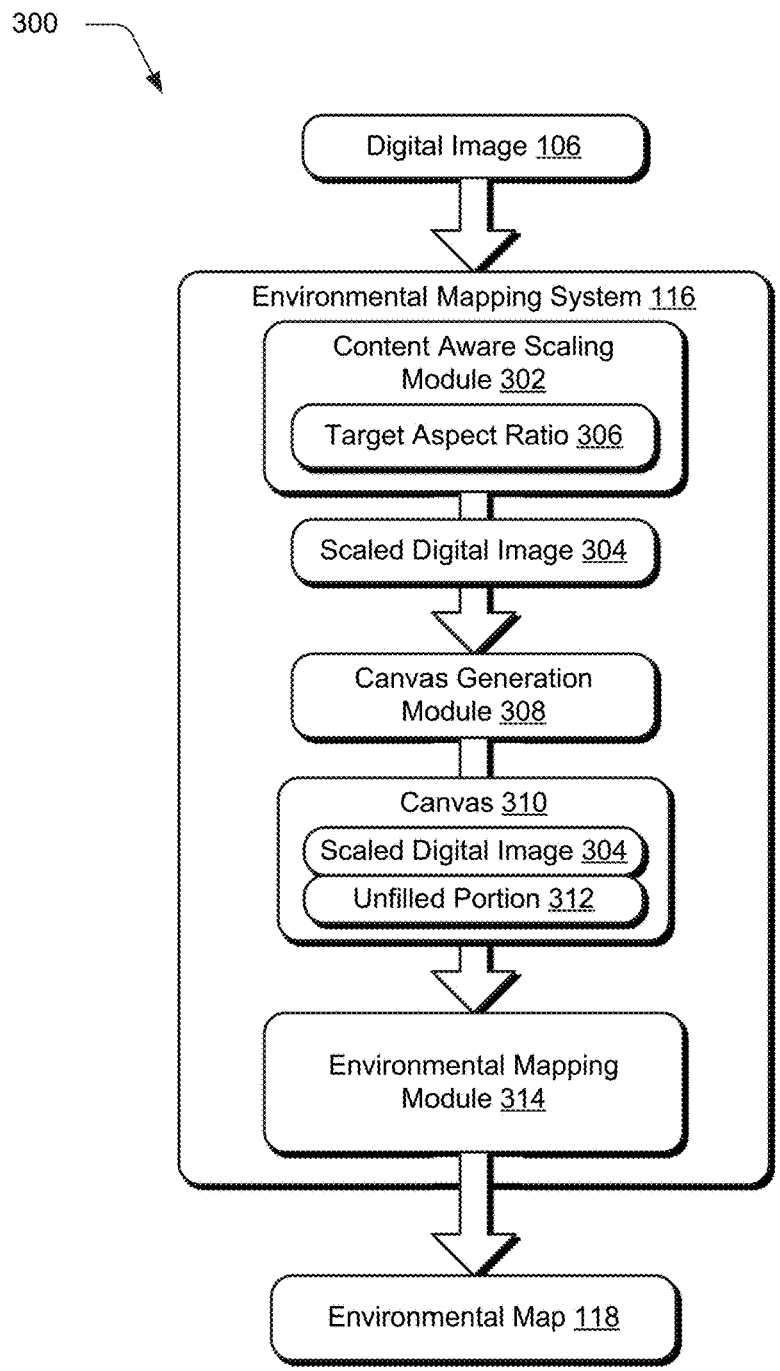
FIG. 3 depicts an example system showing operation of an environmental mapping system of FIG. 1 in greater detail as employing content aware scaling as part of generating an environmental map.

Environmental maps are used to represent an effect of light within an environment of a digital image. Accordingly, environmental maps may be used by a computing device to support a variety of image processing functionality. An example of this is image based lighting (IBL), which is a computer graphics rendering technique that uses the environmental map as an omnidirectional representation of light information encoded as a 360-degree panoramic image. The environmental map, for instance, may be projected onto a sphere and used to specify how light within the environmental of a digital image is to interact with surfaces of objects included in the image. This may be used to add objects to the digital image, remove objects from the digital image, change a direction of lighting within the digital image, add light sources, and so forth.

Conventional techniques to form an environmental map, however, often fail for a digital image that has a field-of-view that is less than 360 degrees. This is typically due to an inability of conventional techniques to accurately convert the reduced field-of-view of the digital image into a 360-degree panoramic image. This failure is typically observed as mismatches on left and right sides of the images, noticeable artifacts due to high frequency at poles within the image, and so forth.

Accordingly, techniques are described to generate an environment map from a digital image, e.g., a digital image having a field-of-view less than 360 degrees. The environmental map is formed as a 360-degree panoramic image to represent light information within the digital image. To do so, an environmental mapping system is implemented at least partially in hardware of a computing device to generate the environmental map from the digital image based on content aware scaling and/or content aware fill.

To begin, a digital image is received as an input by an environmental mapping system. The environmental mapping system scales the input image to have a target aspect ratio, e.g., a two to one aspect ratio, width to height. Depending on an original aspect ratio of the digital image, the width of the image may be increased if the aspect ratio is narrower that two to one or the height of the image may be increased if the aspect ratio is wider than two to one. This may be performed using a variety of scaling techniques, an example of which is a content aware scaling technique that is configured to minimize scaling of salient (i.e., identified as important) objects within the image by creating additional space or removing space from the digital image between these objects.

A canvas is also generated that is dimensionally larger than the digital image, e.g., has dimensions that are twice as large of the digital image. The digital image is then inserted at a center of the canvas, which creates unfilled portion of the canvas that surrounds the image. This unfilled portion of the canvas is then filled. In one example, the filling is performed at least partially by reflecting (i.e., mirroring) the digital image in the horizontal direction and using a content aware fill technique to fill vertical portions of the canvas. This creates an initially filled version of the canvas.

A plurality of polar coordinate canvases is also generated from the canvas, e.g., for poles of the digital image. This is performed by transforming original coordinates (e.g., x/y coordinates) of the digital image into polar coordinates. Unfilled portions of the plurality of polar coordinate canvases resulting from the unfilled portions of the canvas are then also filled using a content aware fill technique. In this instance, however, this content aware fill technique is initialized using the initially filled version of the canvas. This constrains the content aware fill technique to appear similar to the initialization by guiding creation of patches that follow radial directions and change scale towards a center of the polar coordinate canvases that have the unfilled portion.

The plurality of polar coordinate canvases, as filled, are then used to form a plurality of original coordinate canvas portions. Continuing with the previous example, each of the plurality of polar coordinate canvases corresponds to a respective pole (e.g., north or south pole) in the canvas, and thus represents a top and bottom of the canvas, respectively. Accordingly, transformation of the polar coordinates of the polar coordinate canvases to the original coordinates (e.g., x/y coordinates) of the canvas form top and bottom portions of the canvas, referred to as original coordinate canvas portions. The environmental map may thus be formed by combining the original coordinate canvas portions as a 360-degree panoramic image to represent an effect of light within an environment of a digital image. In this way, the content aware scaling, content aware filing, and use of the target aspect ratio (e.g., 2:1) may be used to generate an environmental map that accurately describes an environment within a digital image without introduction of artifacts as found through use of conventional techniques. Further, this environmental map may thus support improved accuracy of image processing techniques that rely on the environmental map, such as to accurately describe an effect of light to add objects to the digital image. Further discussion of these and other examples is included in the following sections.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 17.

The computing device 102 is illustrated as including an image processing system 104. The image processing system 104 is implemented at least partially in hardware of the computing device 102 to process and transform a digital image 106, which is illustrated as maintained in storage 108 of the computing device 102. Such processing includes creation of the digital image 106, modification of the digital image 106, and rendering of the digital image 106 in a user interface 110 for output, e.g., by a display device 112. Although illustrated as implemented locally at the computing device 102, functionality of the image processing system 104 may also be implemented as whole or part via functionality available via the network 114, such as part of a web service or "in the cloud."

An example of functionality incorporated by the image processing system 104 to process the image 106 is illustrated as an environmental mapping system 116. The environmental mapping system 116 is implemented at least partially in hardware of the computing device 102 (e.g., processing system and computer-readable storage media) to generate an environmental map 118 from the digital image 108.

The environmental map 118 represents an effect of light within an environment of a digital image 106. Accordingly, the environmental map 118 may be used to support a variety of image processing functionality. An example of this is represented by an image-based lighting module 120 that is configured to support image based lighting (IBL). Image based lighting is a computer graphics rendering technique that uses the environmental map 118 as an omnidirectional representation of light information encoded as a 360-degree panoramic image. The environmental map 118, for instance, may be projected onto a sphere and used to specify how light within the environmental of a digital image 106 is to interact with surfaces of objects included in the image. This may be used to add objects to the digital image 106, remove objects from the digital image 106, change a direction of lighting within the digital image 106, add light sources, and so forth.

In the example user interface 110, an output 122 of a digital image 106 as rendered by the display device 112 is shown. The digital image 106 includes an object 124 added to an environment of the digital image 106. An appearance of a surface of the object 124 is configured based on the environmental map 118 to appear realistic by avoiding artifacts as typically encountered in conventional environmental map generation techniques. An example contrasting the environmental map generation techniques described herein and conventional environmental map generation techniques is described in the following and shown in FIG. 2.

FIG. 2 depicts an example implementation 200 showing an output 122 of the digital image 106 as displayed by the display device 112 as including an object 124 based on the environmental map 118 generated by the environmental mapping system 116. This is contrasted with an output 202 of a digital image including an object 204 based on conventional environmental mapping techniques. As shown for the output 202 using the conventional environmental mapping techniques, an artifact 206 is introduced on a surface of the object 204 (e.g., a mirrored ball) due to a mismatch of left and right sides of the image as well as artifacts at poles of the object 204 due to high frequency of information environmentally mapped to those poles using the conventional environmental map.

On the other hand, the object 124 in the output 122 of digital image 106, which is also a mirrored ball, does not include these artifacts and thus appears realistic. This realistic appearance is achieved by the environmental mapping system 116 through use of content aware scaling, content aware fill, and use of the target aspect ratio (e.g., 2:1) to generate an environmental map 118 that accurately describes an environment within a digital image 106. In the following discussion, content aware scaling techniques are first described, which is then followed by content aware fill techniques, and then followed by a discussion of a target aspect ratio to generate the environmental map 118.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Environmental Map Generation and Content Aware Scaling

Figure 4:
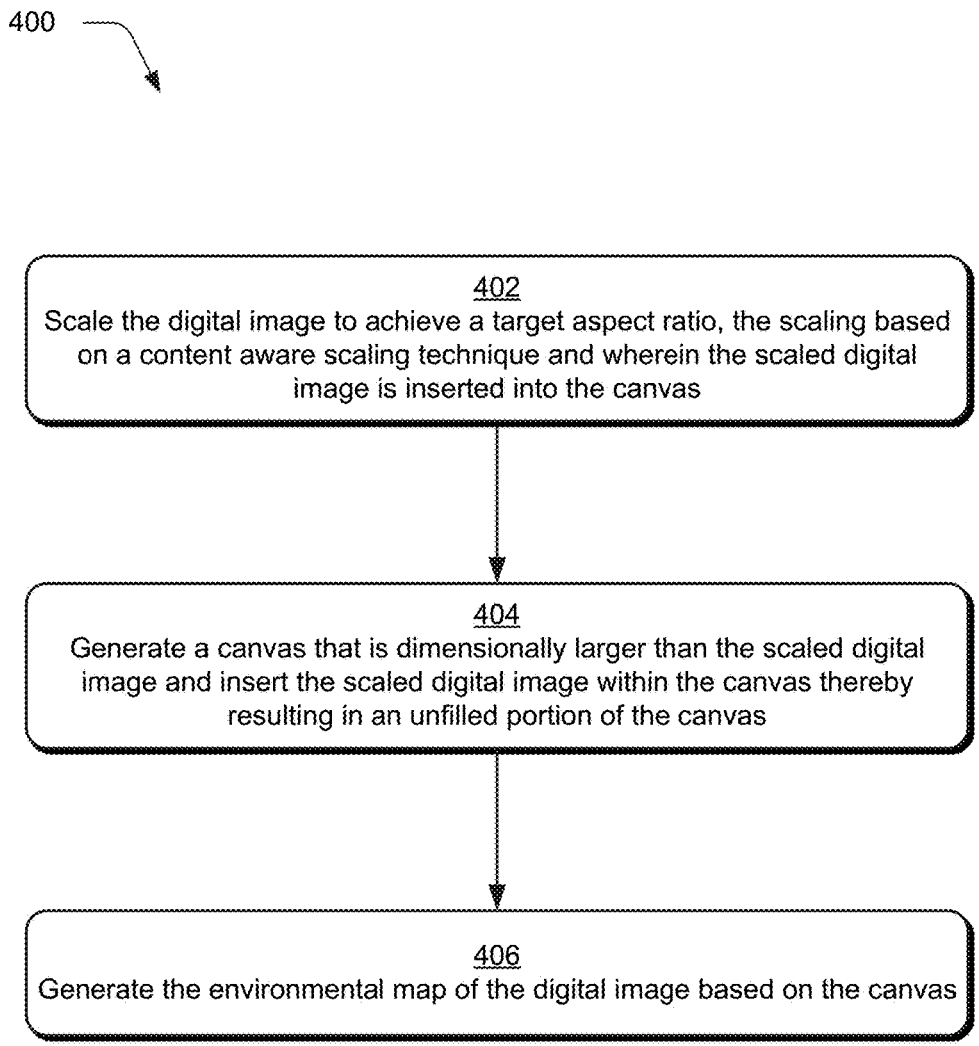
FIG. 4 is a flow diagram depicting a procedure in an example implementation in which a digital image is scaled and a canvas is generated which is to be used as a basis to generate an environmental map.
Figure 5:
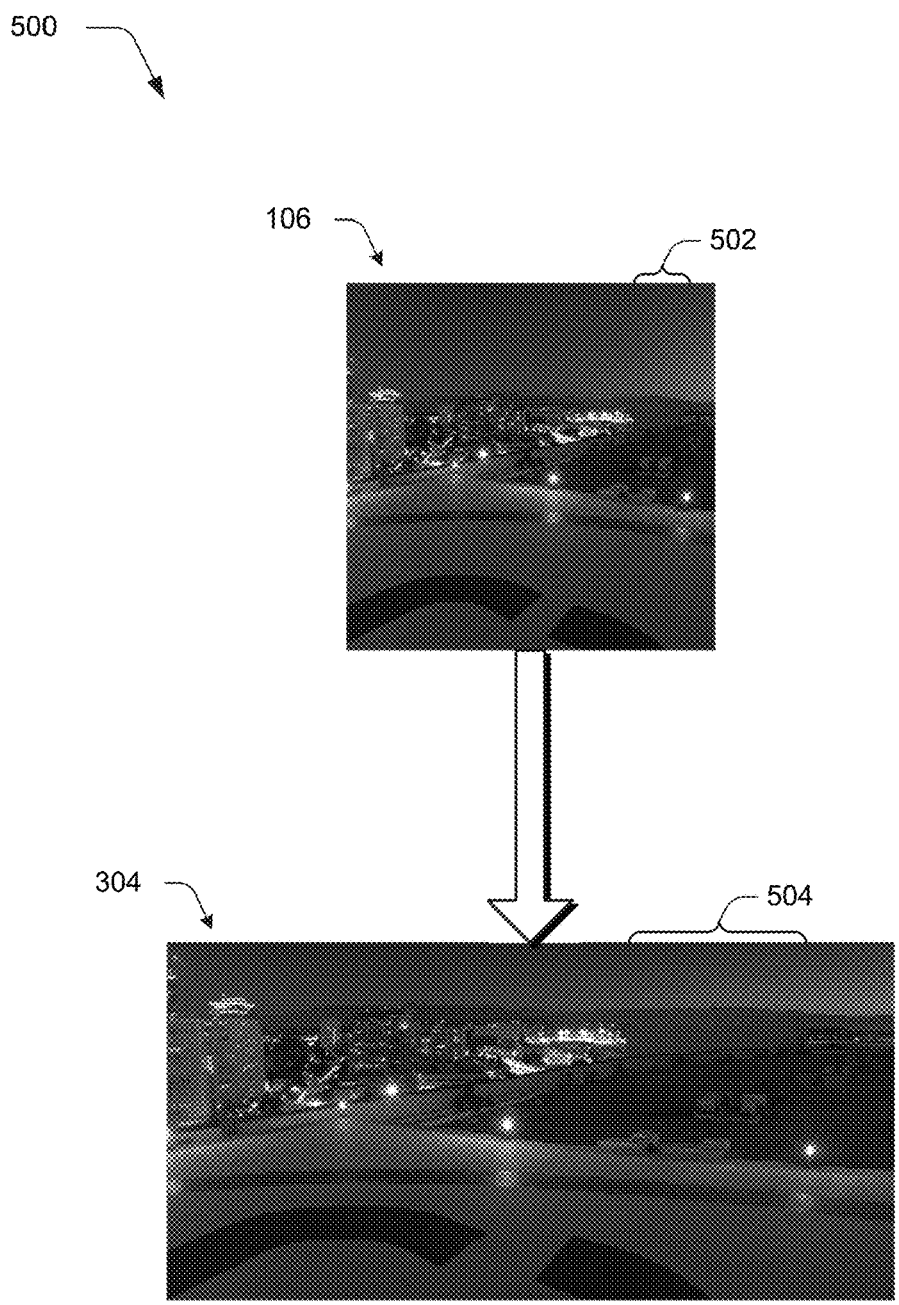
FIG. 5 depicts an example implementation of scaling of a digital image into a target aspect ratio using content aware scaling.
Figure 6:
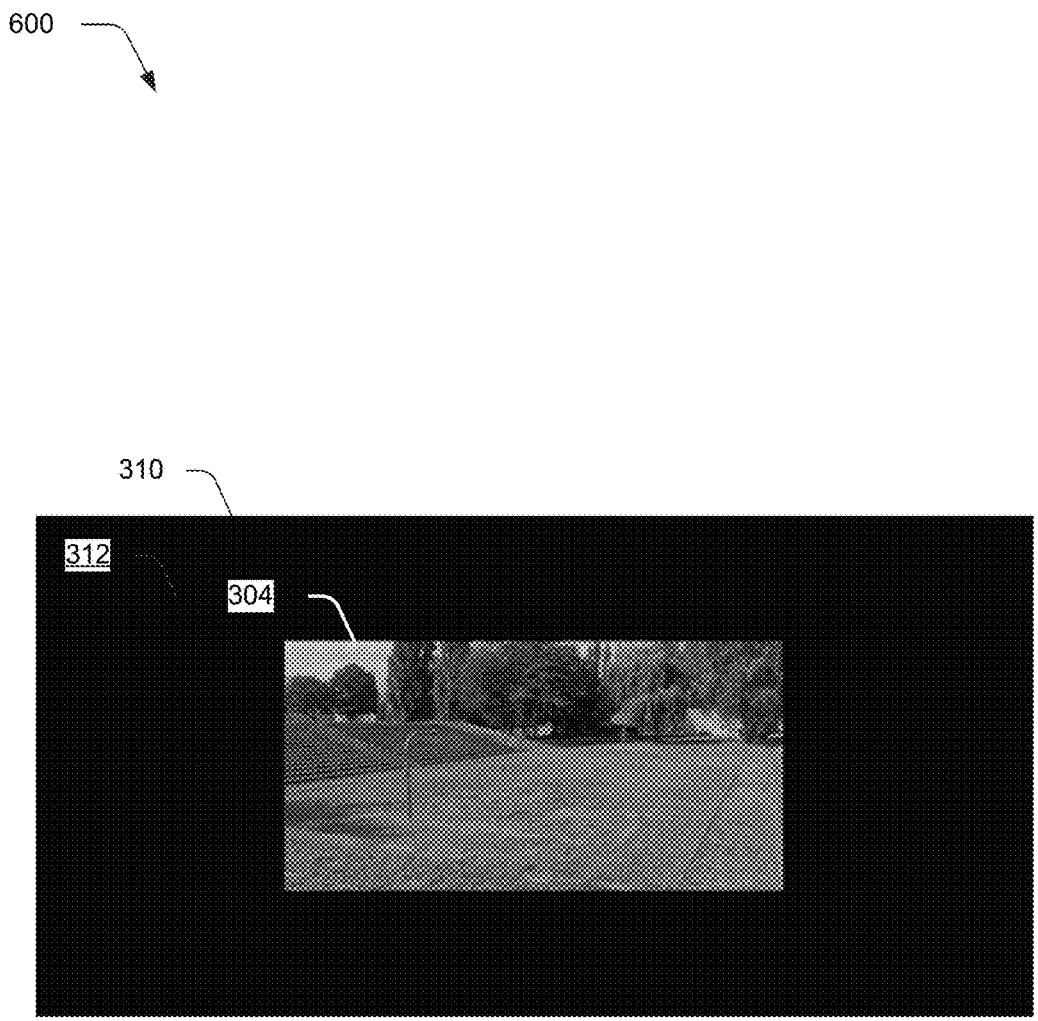
FIG. 6 depicts an example implementation of a canvas generated in accordance with FIGS. 3 and 4 having a digital image inserted within.

FIG. 3 depicts an example system 300 showing operation of the environmental mapping system 116 in greater detail as employing content aware scaling as part of generating an environmental map 118. FIG. 4 depicts a procedure 400 in an example implementation in which a digital image is scaled and a canvas is generated which is to be used as a basis to generate the environmental map 118. FIG. 5 depicts an example implementation 500 of scaling of a digital image into a target aspect ratio using content aware scaling. FIG. 6 depicts an example implementation 600 of a canvas generated in accordance with FIGS. 3 and 4 having a digital image inserted within.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 3-6.

Figure 17:
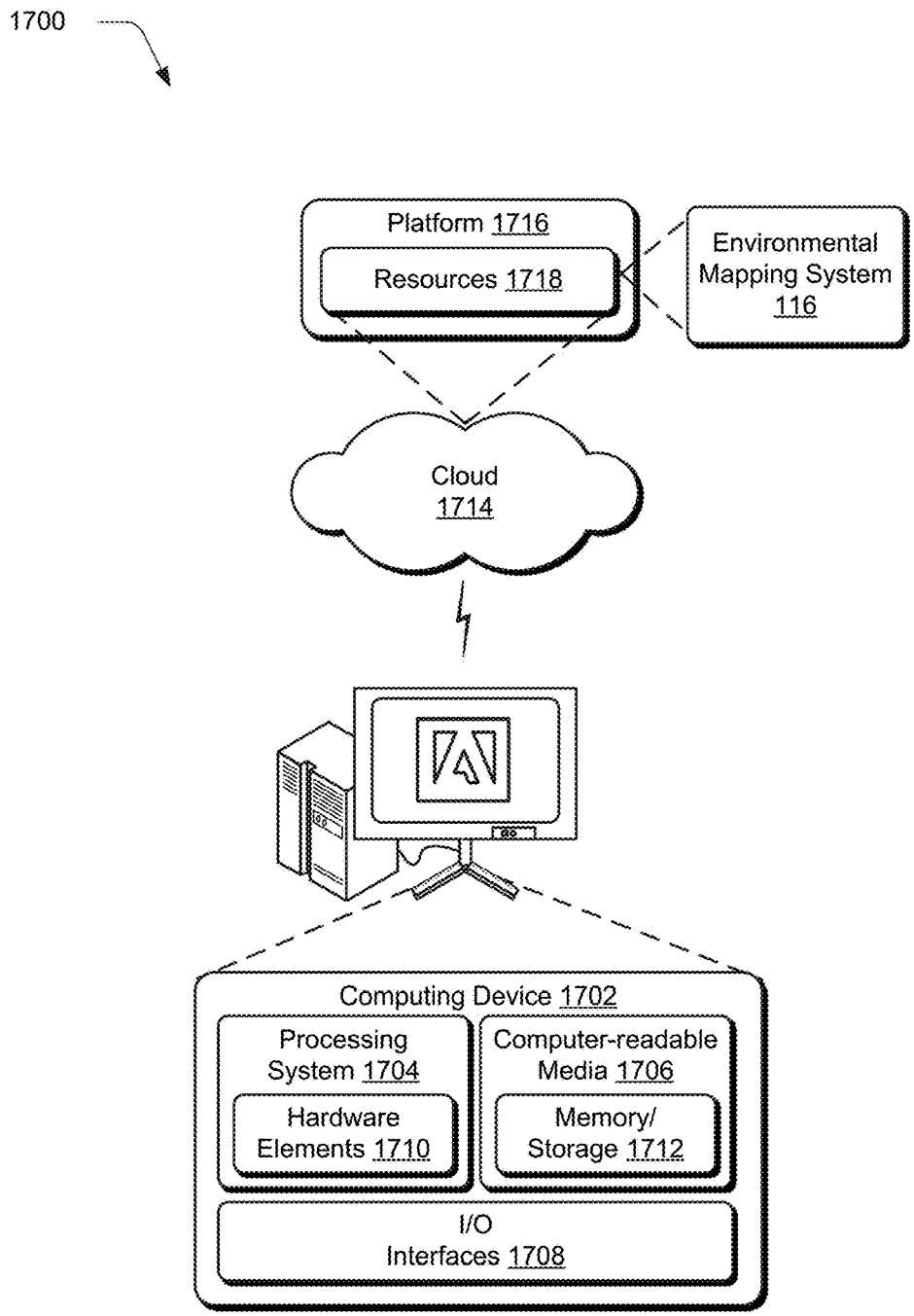
FIG. 17 illustrates an example system including various components of an example device that can be implemented as any type of computing device as described and/or utilize with reference to FIGS. 1-16 to implement embodiments of the techniques described herein.

A digital image 106 is received by the environmental mapping system 116, which may be implemented locally at the computing device 102, "in the cloud" as part of a web platform by a plurality of computing devices as part of one or more server farms as described in relation to FIG. 17, and so forth.

The digital image 106 is then scaled to achieve a target aspect ratio 306 using a content aware scaling technique (block 402). The environmental mapping system 116, for instance, may include a content aware scaling module 302 that is implemented at least partially in hardware of a computing device to perform content aware scaling to achieve a target aspect ratio 306, such as two to one, width to height. An example of content aware scaling is referred to a seam carving. Seam carving is performed by the content aware scaling module 302 by establishing a number of seams (e.g., paths) in the digital image 106 in an image. The paths are used to identify relative importance (i.e., saliency) of portions (e.g., objects) within the image. This importance may then be used to protect these salient objects from scaling and thus minimize an effect of overall scaling of the digital image 106 by adding or removing seams (e.g., paths) of least importance in the image to reduce or extend a scale of the digital image 106 in a desired direction to achieve a scaled digital image 304. This importance is based on an energy exhibited by the path. Depending on the original aspect ratio, the image width is increased if the aspect ratio is narrower than the target aspect ratio or the image height is increased if the aspect ratio of the digital image 106 is wider that then target aspect ratio 304. The target aspect ratio 304 in this example is approximately two to one, width to height, which exhibits greater computational resource efficiency and more realistic results as further described in relation to FIGS. 15 and 16 and corresponding section in the following.

As shown in FIG. 5, for instance, the digital image 106 has an aspect ratio that is less than the target aspect ratio of 2:1. Accordingly, the content aware scaling module 302 using content aware scaling to add a number of seams to a portion 502 of the digital image that exhibits lower energy, i.e., entropy, to result in the scaled digital image 304. In this way, salient objects such as the building and lights are protected from scaling and subsequent distortion that may be caused by this scaling.

A canvas is also generated that is dimensionally larger than the scaled digital image and the scaled digital image is inserted within the canvas thereby resulting in an unfilled portion of the canvas (block 404). The scaled digital image 304, for instance, may be received by a canvas generation module 308. The canvas generation module 308 is implemented at least partially in hardware of the computing device 102 to generate a canvas 310, e.g., allocate memory, such that a dimensional size of the canvas 310 is larger (e.g., twice as large to double a 180 degree field-of-view of the image) as the scaled digital image 304. As shown in FIG. 6, for instance, the scaled digital image 304 is placed at a center of the canvas 310. As a result, the canvas 310 includes an unfilled portion 312 that surrounds the inserted digital image 304.

An environmental map 118 of the digital image 106 is then generated based on the canvas 310 (block 406). The unfilled portion 312, for instance, has vertical unfilled portions and horizontal unfilled portions which are then filled by the environmental mapping module 314. The filling of these portions is performed using a content aware fill technique to generate the environmental map 118 as an omnidirectional representation of light information encoded by a computing device as a 360-degree panoramic image using the canvas 310. An example of filling the unfilled portion 312 of the canvas 310 is described in the following section and shown using corresponding figures.

Environmental Map Generation and Content Aware Fill

Figure 7:
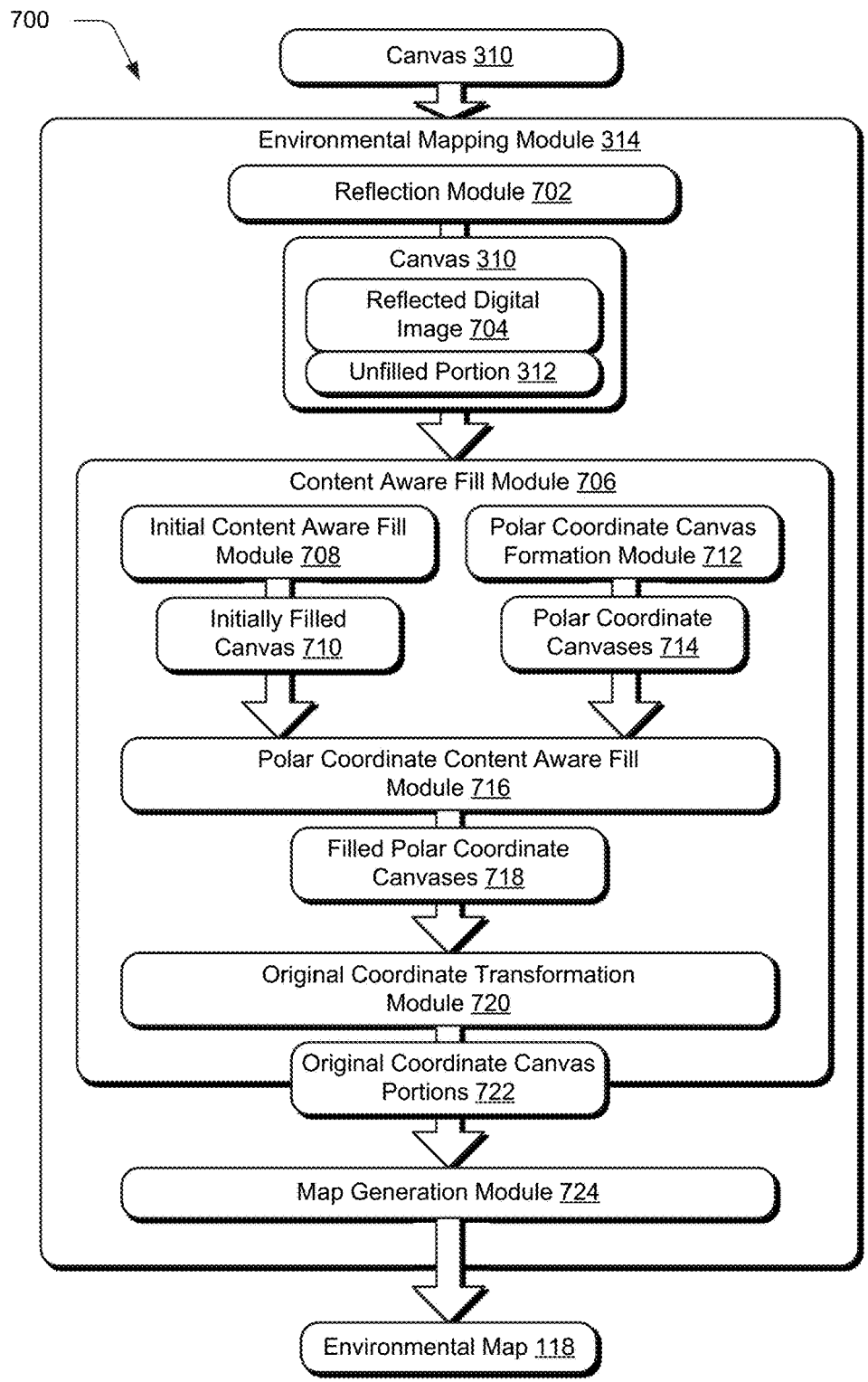
FIG. 7 depicts an example system showing operation of an environmental mapping module of FIG. 3 in greater detail as employing content aware fill as part of generating an environmental map.
Figure 8:
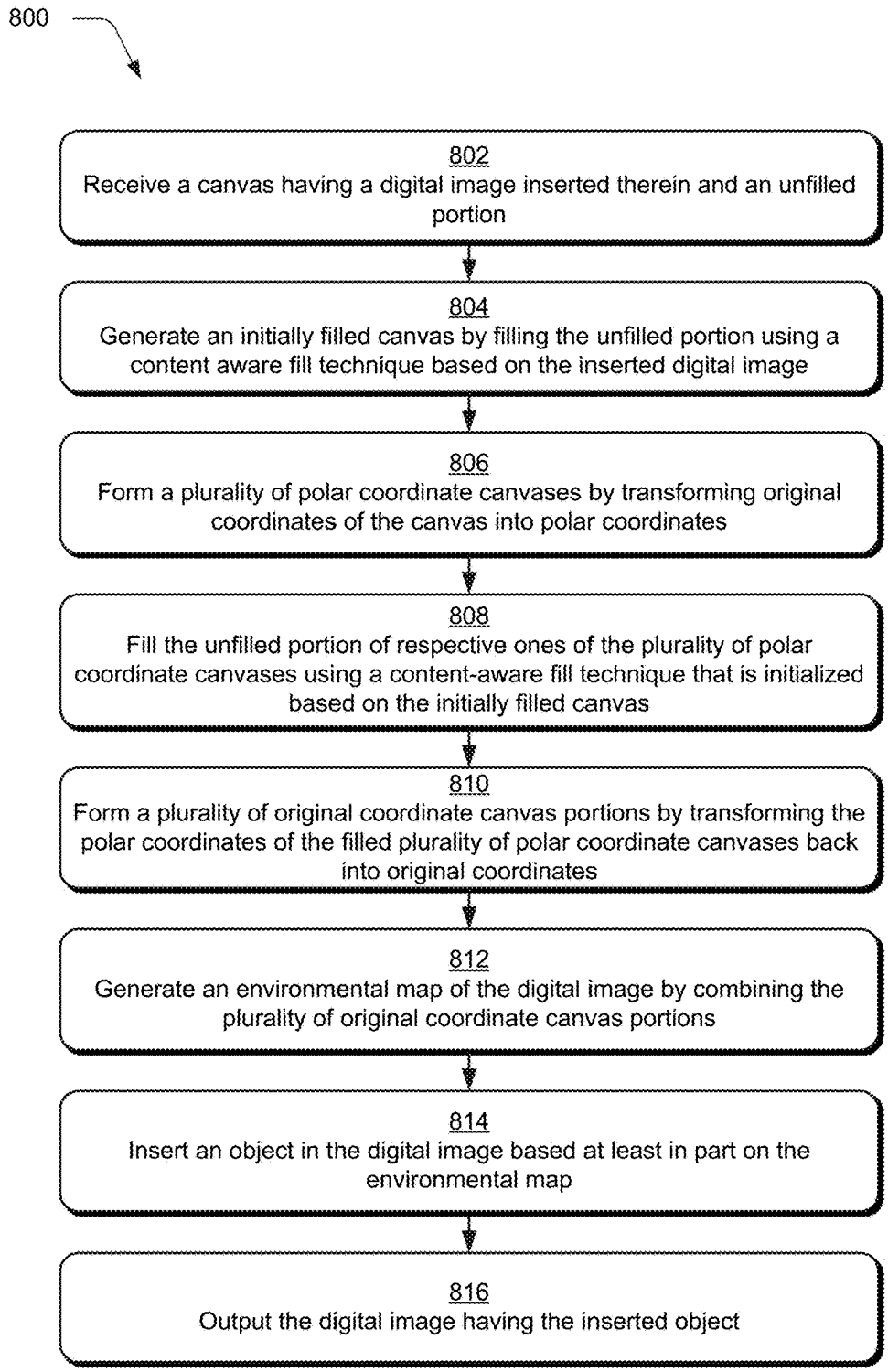
FIG. 8 depicts a procedure in an example implementation in which a canvas of FIGS. 3 and 4 is used to generate the environmental map using a content aware fill technique.
Figure 9:
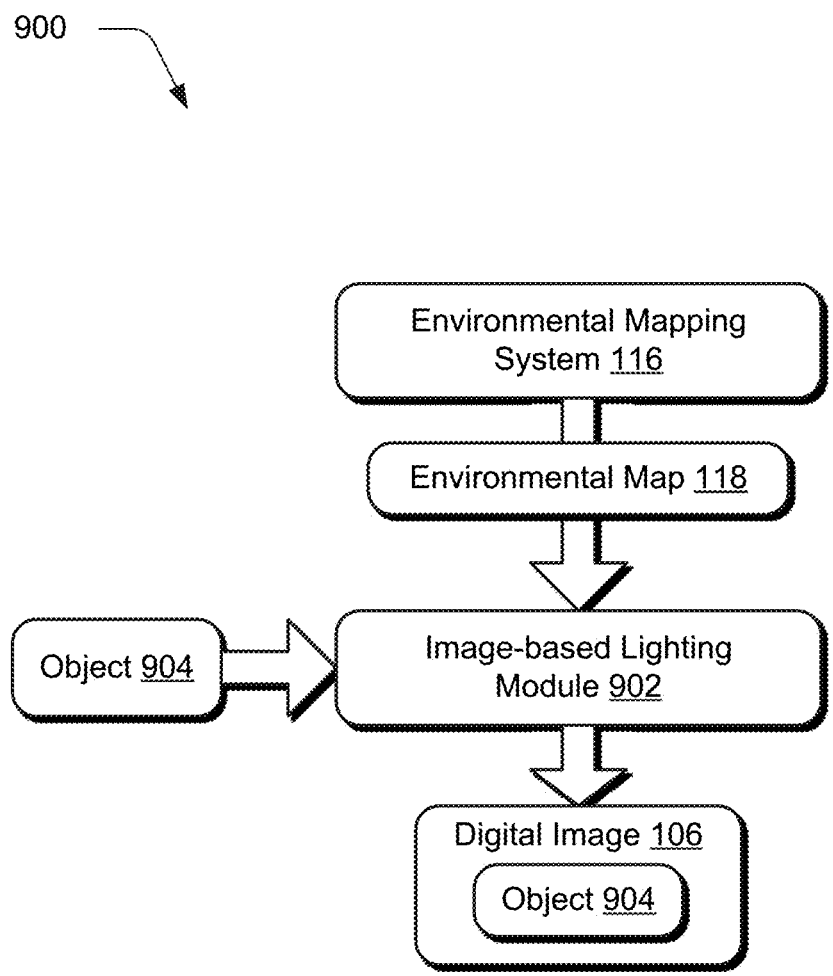
FIG. 9 depicts a system in an example implementation in which the environmental map generated in FIGS. 7 and 8 is used to process a digital image to include an object.
Figure 14:
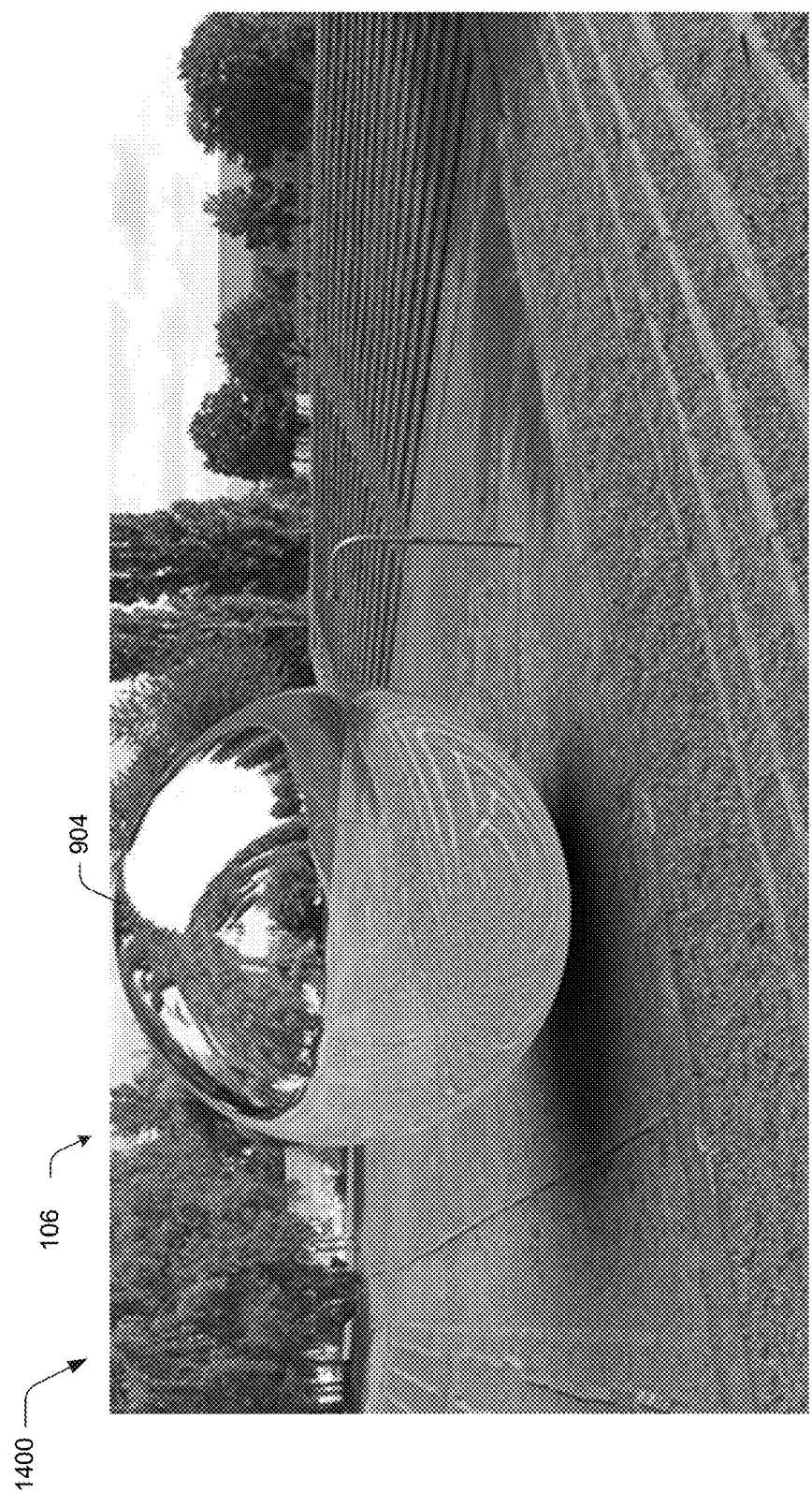
FIG. 14 depicts an example implementation of addition of an object to the digital image using the environmental map of FIG. 13.

FIG. 7 depicts an example system 700 showing operation of the environmental mapping module 314 of FIG. 3 in greater detail as employing content aware fill as part of generating an environmental map 118. FIG. 8 depicts a procedure 800 in an example implementation in which a canvas 310 of FIGS. 3 and 4 is used to generate the environmental map 118 using a content aware fill technique. FIG. 9 depicts a system 900 in an example implementation in which the environmental map 118 generated in FIGS. 7 and 8 is used to process a digital image 106 to include an object, an example result of which is shown in FIG. 14.

Figure 10:
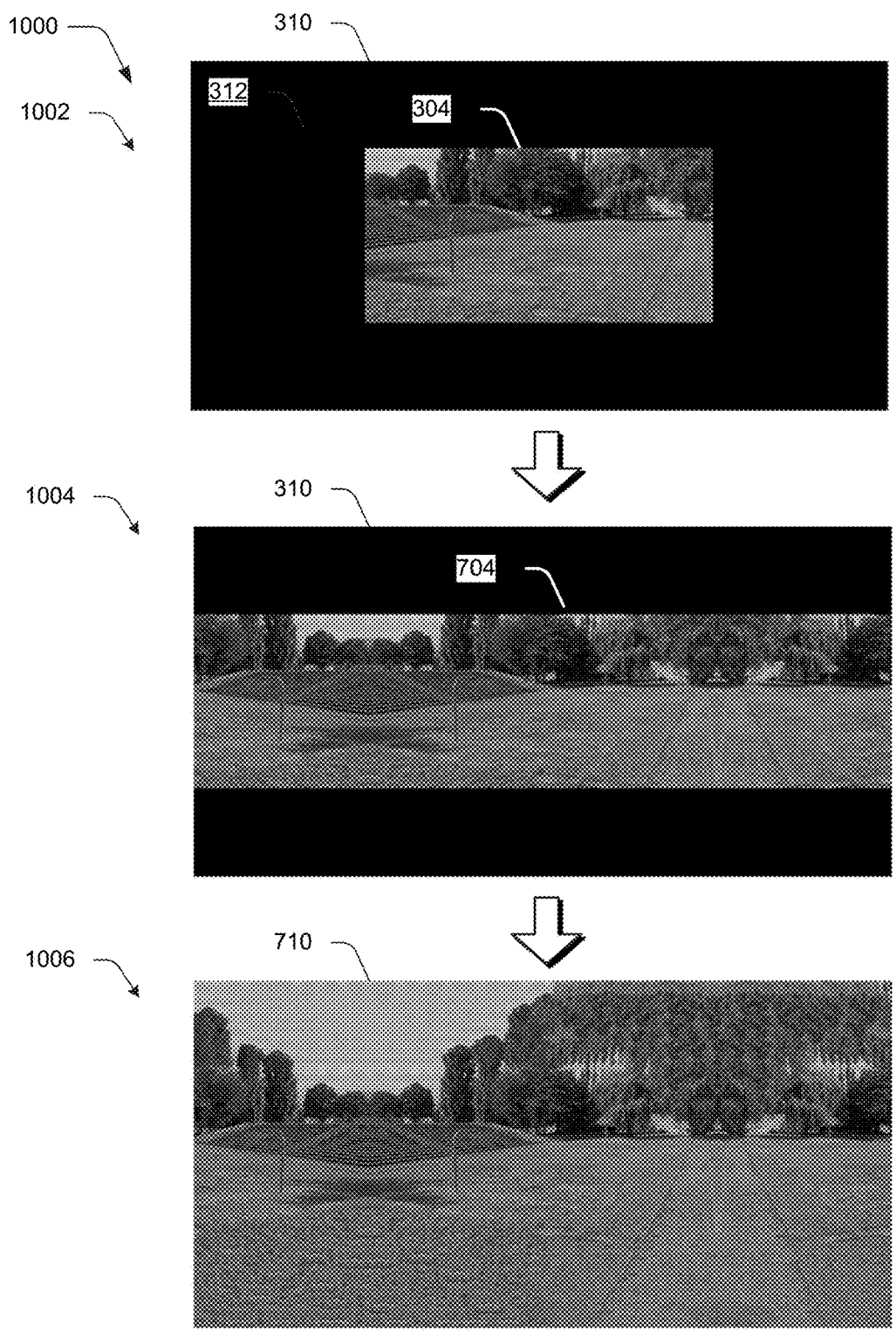
FIG. 10 depicts an example implementation in which the canvas having the inserted digital image is filled using a content aware fill technique to generate an initially filled canvas.
Figure 11:
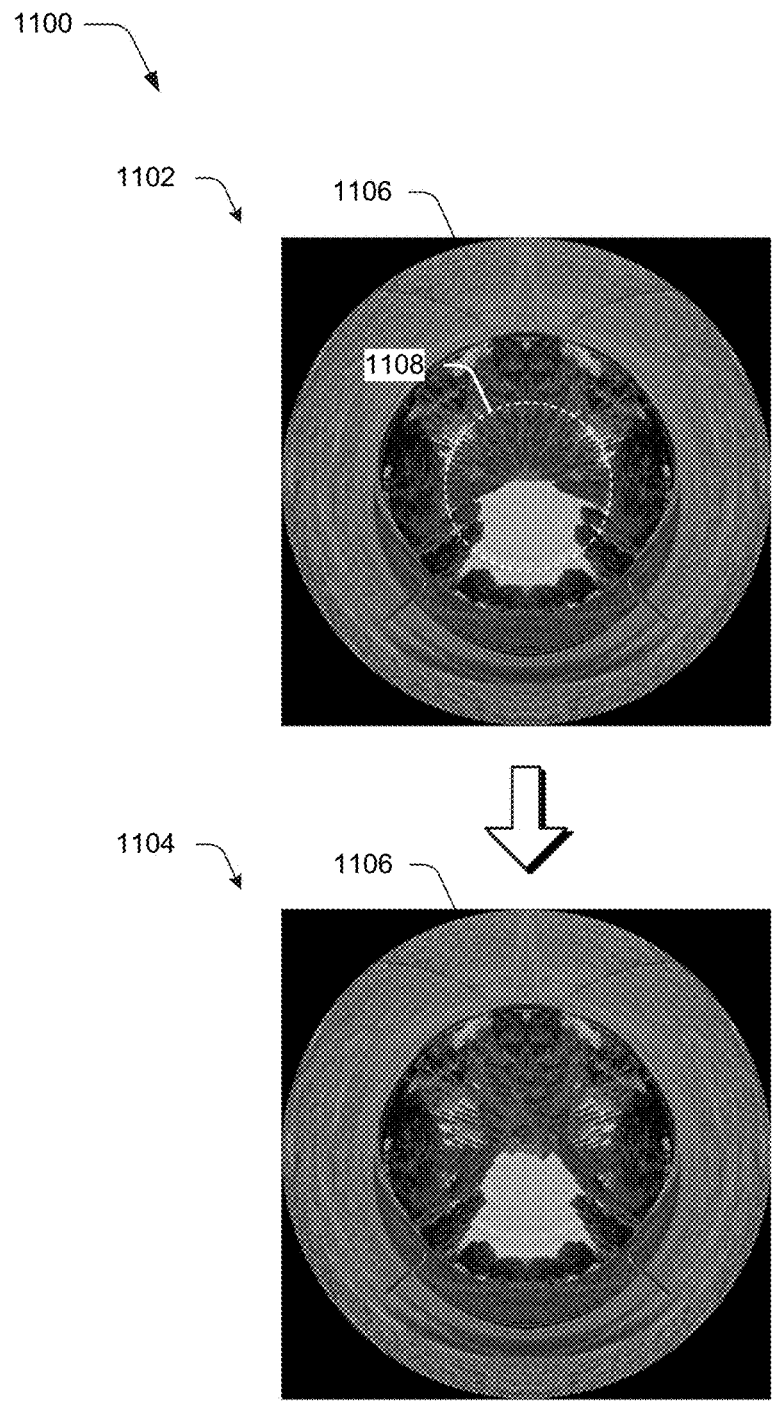
FIG. 11 depicts an example implementation in which the canvas is transformed into a polar coordinate canvas and filled using a content aware fill technique as initialized by the initially filled canvas of a third stage of FIG. 10.
Figure 12:
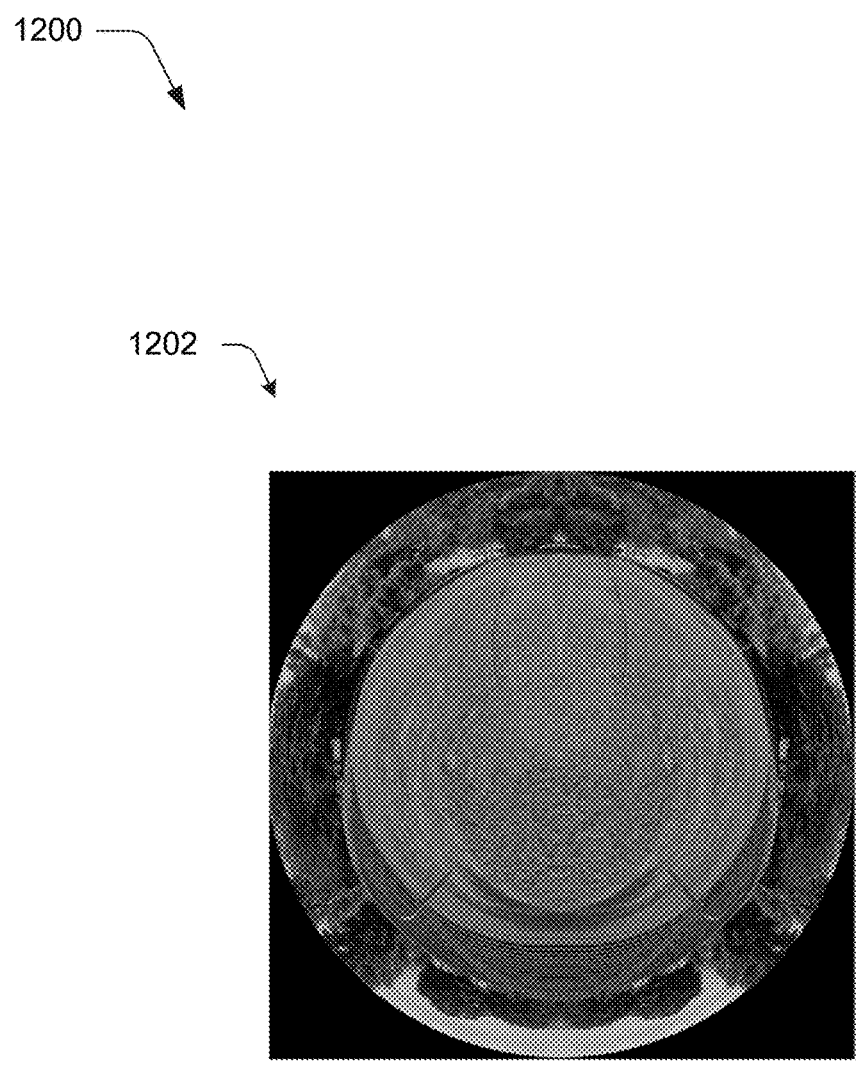
FIG. 12 depicts an example implementation of another polar coordinate canvas formed from the canvas is filled using a content aware fill technique.
Figure 13:
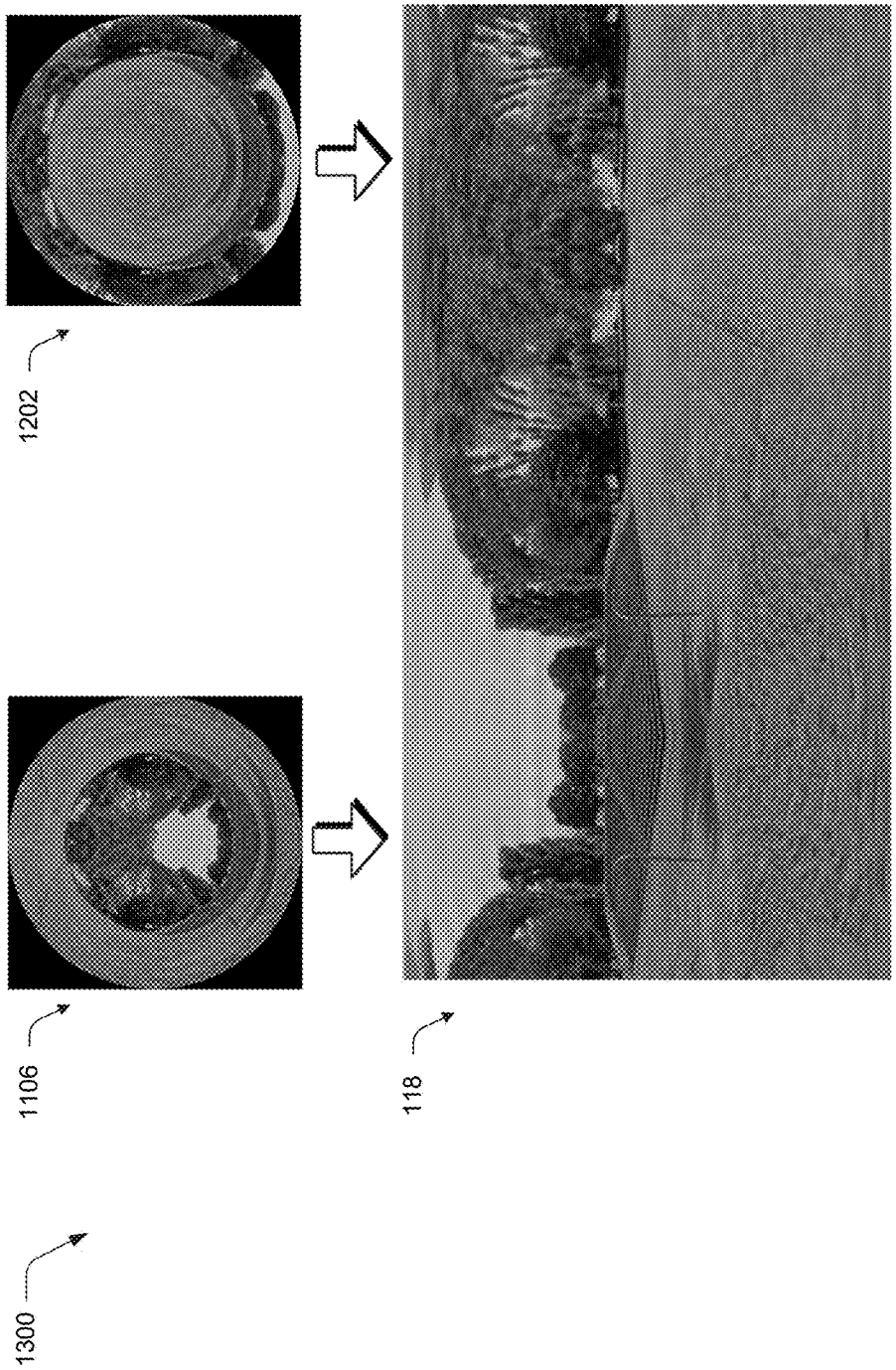
FIG. 13 depicts an example implementation in which the polar coordinate canvases of FIGS. 11 and 12 are converted back to original coordinates and combined to form the environmental map.

FIG. 10 depicts an example implementation 1000 in which the canvas 310 having the inserted digital image is filled using a content aware fill technique to generate an initially filled canvas. FIG. 10 is illustrated using first, second, and third stages 1002, 1004, 1006. FIG. 11 depicts an example implementation 1100 in which the canvas 310 is transformed into a polar coordinate canvas and filled using a content aware fill technique as initialized by the initially filled canvas of the third stage 1006 of FIG. 10. FIG. 11 is depicted using first and second stages 1002, 1004. FIG. 12 depicts an example implementation 1200 of another polar coordinate canvas formed from the canvas is filled using a content aware fill technique. FIG. 13 depicts an example implementation 1300 in which the polar coordinate canvases of FIGS. 11 and 12 are converted back to original coordinates and combined to form the environmental map. FIG. 14 depicts an example implementation 1400 of addition of an object to the digital image using the environmental map of FIG. 13.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 7-14.

A canvas 310 is received having a digital image inserted therein and an unfilled portion (block 802). The canvas 310 of FIG. 3, for instance, may be received by the environmental mapping module 314 that includes the inserted and scaled digital image 304 and an unfilled portion 312. Techniques are now described in which the unfilled portion 312 is filled to generate the environmental map 118.

An initially filled canvas is generated by filling the unfilled portion using a content aware fill technique based on the inserted digital image (block 804). In this example, a reflection module 702 is first employed that is implemented at least partially in hardware to reflect the inserted and scaled digital image 304 to form a reflected digital image 704 within the canvas.

As shown at the first stage 1002 of FIG. 10, for instance, the canvas 310 includes the inserted and scaled digital image 304 and unfilled portion 312. To fill horizontal unfilled portions (i.e., portions of the unfilled portion 312 that are horizontal to the scaled digital image 304 within the canvas 310), a reflection technique is employed by the reflection module 702. The reflection technique causes the digital image 304 to be mirrored at both ends. By doing this, the reflected digital image 704 may be seamlessly wrapped around a sphere.

The canvas 310 having the reflected digital image 704 and remaining unfilled portion 312 is then received by a content aware fill module 706. The content aware fill module 706 is configured to fill the vertical unfilled portions 312 that remain in the canvas. To do so, an initial content aware fill module 708 is first employed to generate an initially filled canvas 710.

Returning again to FIG. 10, the initial content aware fill module 708, for instance, may first apply a content aware fill technique to the top and bottom rectangles that define the remaining unfilled portion of the canvas 310. Content aware fill may be implemented in a variety of ways, such as through a patch matching technique. Patch matching techniques rely on generation of patches and patch correspondence by defining a nearest-neighbor field as a function of offsets, which is over all possible matches of a location of patch centers within the digital image 106. In an implementation, a search radius of the content aware fill (i.e., the patch matching technique) is limited to a predefined amount (e.g., twenty percent) of the height of the reflected digital image 704 such that the technique only samples from respective top or bottom portions of the image. A result of this initially filled canvas 710 is shown at the third stage 1006 of FIG. 10. As shown, the initially filled canvas 710 is filled, but the environment is incorrect due to inaccuracies in a lack of increased stretching when nearing the top or bottom borders of the image.

Accordingly, the content aware fill technique is then rerun in polar coordinates. As illustrated in FIG. 7, for instance, a polar coordinate canvas formation module 712 is implemented at least partially in hardware of a computing device 102 to generate a plurality of polar coordinate canvases 714. The plurality of polar coordinate canvases is formed by transforming original coordinates of the canvas 310 into polar coordinates (block 806). The canvas 310, for instance, may be defined using x/y coordinates, e.g., Cartesian coordinates. These x/y coordinates of the canvas 310 are transformed into polar coordinates which describe a relationship to respective poles defined within an environment of the digital image 106, e.g., top and bottom or "north and south" poles. This results in the canvas 310 as following the original coordinates to form a plurality of polar coordinate canvases 714 defining relationships to respective poles.

The unfilled portion of respective ones of the plurality of polar coordinate canvases 714 are then filled using a content-aware fill technique that is initialized based on the initially filled canvas 710 (block 808). This is performed through use of a polar coordinate content aware fill module 716 to generate filled polar coordinate canvases 718. In this way, the initially filled canvas 710 is used to constrain operation of the content aware fill (e.g., patch matching technique) to appear similar to the initialization, e.g., the initially filled canvas.

As shown at a first stage 1102 of FIG. 11, for instance, a first polar coordinate canvas 1106 includes an unfilled portion 1108 as represented by a dashed disk. An area within the unfilled portion 1108 is then initialized using the initially filled canvas 710 to fill the portion, a result of which is shown at the second stage 1104. A similar technique is also employed for a second polar coordinate canvas 1202 in FIG. 12.

A plurality of original coordinate canvas portions 722 is then formed by transforming the polar coordinates of the filled plurality of polar canvases 718 back into original coordinates (block 810) by an original coordinate transformation module 720. The original coordinate transformation module 720, for instance, is implemented at least partially in hardware of a computing device to transform polar coordinates based into original coordinates of the canvas 310, e.g., x/y coordinates. This causes generation top and bottom portions that corresponding to respective poles of the canvas 310. An environmental map of the digital image is generated by combining the plurality of original coordinate canvas portions (block 812). As shown in FIG. 13, for instance, the first and second polar coordinate canvases 1106, 1202 are transformed back into original coordinates and combined to form an omnidirectional representation of light information encoded by a computing device as a 360-degree panoramic image, i.e., the environmental map 118. As illustrated, the environmental map 118 includes stretching at the top and bottom borders, which provides a realistic description of an environment of the digital image 106.

As previously described, the environmental map 118 may be used to support a variety of image processing functionality. As shown in the system 900 of FIG. 9, for instance, an image-based lighting module 902 is shown that accepts as an input the environmental map 118 and an object 904 to be included in a digital image 106. The object is inserted into the digital image based at least in part on the environmental map 118 (block 814) and the digital image 106 having the inserted object 904 is output (block 816). An example of this is shown in FIG. 14 in which the object 904 is a mirrored ball and includes a surface that accurately and realistically reflects light from an environment of the digital image 106 based on the environmental map 118.

Environmental Map Generation and Target Aspect Ratio

Aspect ratio of the original input image has a direct effect on a size and shape of an unfilled region in the canvas 310 and polar coordinate canvases 714 generated from the canvas 310. Through testing of the techniques described herein, it has been found that a target aspect ratio 306 of two to one, width to height, provides realistic results and improved efficiency in computational resource consumption.

Figure 15:
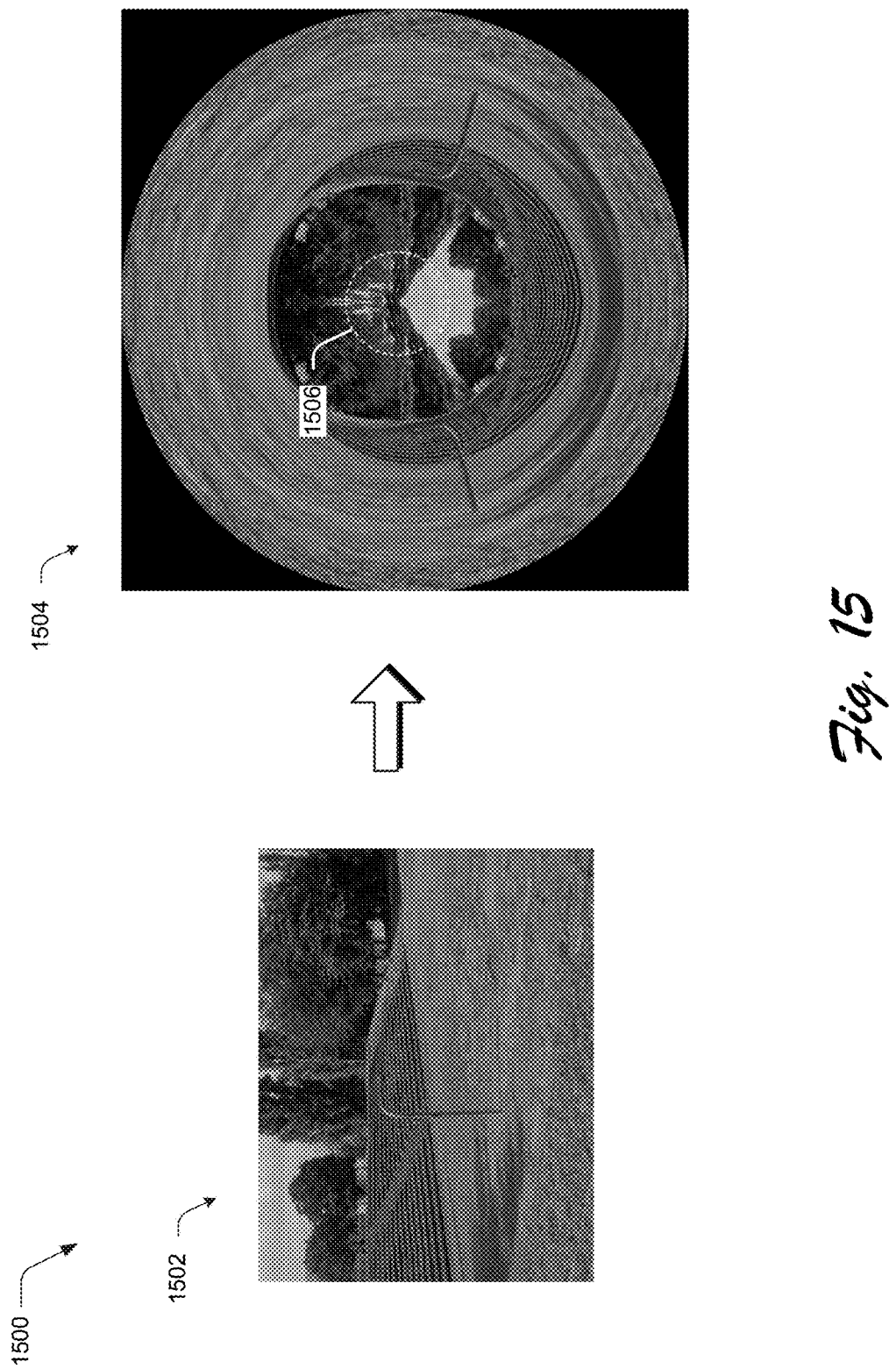
FIG. 15 depicts an example implementation of translation of a digital image having an aspect ratio that is narrower than two to one (e.g., portrait format) into a polar coordinate canvas and size of a resulting unfilled region.

For example, FIG. 15 depicts an example implementation 1500 of translation of a digital image 1502 having an aspect ratio that is narrower than two to one (e.g., portrait format) into a polar coordinate canvas 1504 and size of a resulting unfilled region 1506. The size of the unfilled region 1506 in this example, as the aspect ratio gets narrower width wise, causes the unfilled region 1506 to successively "close up" and result in artifacts.

Figure 16:
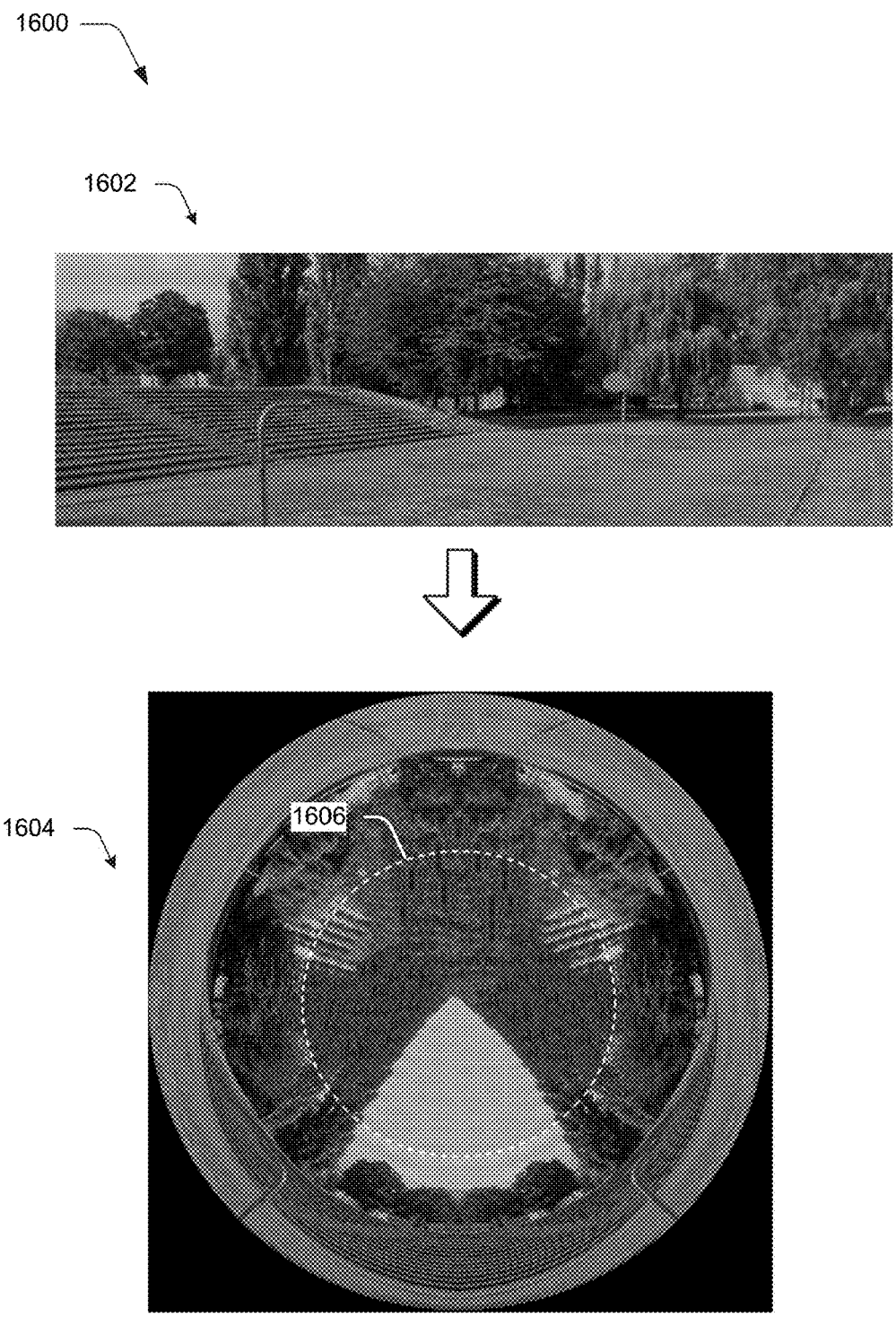
FIG. 16 depicts an example implementation of translation of a digital image having an aspect ratio that is wider than two to one into a polar coordinate canvas and size of a resulting unfilled region.

On the other hand, FIG. 16 depicts an example implementation 1600 of translation of a digital image 1602 having an aspect ratio that is wider than two to one into a polar coordinate canvas 1604 and size of a resulting unfilled region 1606. As the aspect ratio gets progressively wider that 2:1, a size of the unfilled region expands, which may result in an area that is too large to achieve reliable and realistic results. Further, consumption of computational resources also increases. Accordingly, it has been found that an aspect ratio of 2:1 achieves realistic results in an efficient manner.

Example System and Device

FIG. 17 illustrates an example system generally at 1700 that includes an example computing device 1702 that is representative of one or more computing systems and/or devices that may implement the various techniques described herein. This is illustrated through inclusion of the environmental mapping system 116. The computing device 1702 may be, for example, a server of a service provider, a device associated with a client (e.g., a client device), an on-chip system, and/or any other suitable computing device or computing system.

The example computing device 1702 as illustrated includes a processing system 1704, one or more computer-readable media 1706, and one or more I/O interface 1708 that are communicatively coupled, one to another. Although not shown, the computing device 1702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1704 is representative of functionality to perform one or more operations using hardware. Accordingly, the processing system 1704 is illustrated as including hardware element 1710 that may be configured as processors, functional blocks, and so forth. This may include implementation in hardware as an application specific integrated circuit or other logic device formed using one or more semiconductors. The hardware elements 1710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1706 is illustrated as including memory/storage 1712. The memory/storage 1712 represents memory/storage capacity associated with one or more computer-readable media. The memory/storage component 1712 may include volatile media (such as random access memory (RAM)) and/or nonvolatile media (such as read only memory (ROM), Flash memory, optical disks, magnetic disks, and so forth). The memory/storage component 1712 may include fixed media (e.g., RAM, ROM, a fixed hard drive, and so on) as well as removable media (e.g., Flash memory, a removable hard drive, an optical disc, and so forth). The computer-readable media 1706 may be configured in a variety of other ways as further described below.

Input/output interface(s) 1708 are representative of functionality to allow a user to enter commands and information to computing device 1702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1710 and computer-readable media 1706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1710. The computing device 1702 may be configured to implement particular instructions and/or functions corresponding to the software and/or hardware modules. Accordingly, implementation of a module that is executable by the computing device 1702 as software may be achieved at least partially in hardware, e.g., through use of computer-readable storage media and/or hardware elements 1710 of the processing system 1704. The instructions and/or functions may be executable/operable by one or more articles of manufacture (for example, one or more computing devices 1702 and/or processing systems 1704) to implement techniques, modules, and examples described herein.

The techniques described herein may be supported by various configurations of the computing device 1702 and are not limited to the specific examples of the techniques described herein. This functionality may also be implemented all or in part through use of a distributed system, such as over a "cloud" 1714 via a platform 1716 as described below.

The cloud 1714 includes and/or is representative of a platform 1716 for resources 1718. The platform 1716 abstracts underlying functionality of hardware (e.g., servers) and software resources of the cloud 1714. The resources 1718 may include applications and/or data that can be utilized while computer processing is executed on servers that are remote from the computing device 1702. Resources 1718 can also include services provided over the Internet and/or through a subscriber network, such as a cellular or Wi-Fi network.

The platform 1716 may abstract resources and functions to connect the computing device 1702 with other computing devices. The platform 1716 may also serve to abstract scaling of resources to provide a corresponding level of scale to encountered demand for the resources 1718 that are implemented via the platform 1716. Accordingly, in an interconnected device embodiment, implementation of functionality described herein may be distributed throughout the system 1700. For example, the functionality may be implemented in part on the computing device 1702 as well as via the platform 1716 that abstracts the functionality of the cloud 1714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to generate an environmental map of a digital image, a method implemented by a computing device, the method comprising:
    receiving, by the computing device, a canvas having a digital image inserted therein and an unfilled portion;
    generating, by the computing device, an initially filled canvas by filling the unfilled portion using a content aware fill technique based on the inserted digital image;
    forming, by the computing device, a plurality of polar coordinate canvases by transforming original coordinates of the canvas into polar coordinates;
    filling, by the computing device, the unfilled portion of respective ones of the plurality of polar coordinate canvases using a content-aware fill technique that is initialized based on the initially filled canvas;
    forming, by the computing device, a plurality of original coordinate canvas portions by transforming the polar coordinates of the filled plurality of polar coordinate canvases back into original coordinates; and
    generating, by the computing device, an environmental map of the digital image by combining the plurality of original coordinate canvas portions.

2. The method as described in claim 1, further comprising scaling, by the computing device, the digital image to achieve a target aspect ratio, the scaling based on a content aware scaling technique and wherein the scaled digital image is inserted into the canvas.

3. The method as described in claim 2, wherein the content aware scaling technique is configured such that scaling of portion of the image that is identified as salient is minimized with respect to another portion of the image that is not identified as important.

4. The method as described in claim 2, wherein the content aware scaling technique is performed using seam filling.

5. The method as described in claim 2, further comprising inserting, by the computing device, the scaled digital image into the canvas, the canvas is dimensionally larger than the scaled image thereby resulting in the unfilled portion of the canvas.

6. The method as described in claim 5, wherein the inserting includes inserting the digital image at a center of the canvas that is twice as large, dimensionally, as the digital image.

7. The method as described in claim 1, wherein the filling further comprises reflecting a portion of the inserted digital image in the canvas.

8. The method as described in claim 7, wherein the reflecting fills horizontal unfilled portions of the canvas and the filling using the content aware fill technique fills vertical unfilled portions of the canvas.

9. The method as described in claim 1, wherein the target aspect ratio is two to one, width to height.

10. The method as described in claim 1, further comprising inserting an object within the digital image as having an appearance that is based at least partially on the environmental map and outputting the digital image as having the object.

11. The method as described in claim 1, wherein the original coordinates are defined based on a vertical axis and a horizontal axis.

12. In a digital medium environment to generate an environmental map of a digital image, an environmental mapping system comprising:
    a content aware scaling module implemented at least partially in hardware of a computing device to scale the digital image to achieve a target aspect ratio using a content aware scaling technique;
    a canvas generation module implemented at least partially in hardware of a computing device to generate a canvas that is dimensionally larger than the scaled digital image and insert the scaled digital image within the canvas thereby resulting in an unfilled portion of the canvas; and
    an environmental mapping module implemented at least partially in hardware of a computing device to generate the environmental map of the digital image based on the canvas, the environmental map encoding light information of the digital image.

13. The system as described in claim 12, wherein the content aware scaling technique is configured such that:
   scaling of portion of the image that is identified as important is minimized with respect to another portion of the image that is not identified as important; or using seam filling.

14. The system as described in claim 12, wherein the environmental map encodes the light information of the digital image as a 360-degree panoramic image.

15. The system as described in claim 12, wherein the environmental mapping module includes:
   an initial content aware fill module implemented at least partially in hardware of a computing device to generate an initially filled canvas by filling the unfilled portion using a content aware fill technique based on the inserted digital image;
   a polar coordinate canvas formation module implemented at least partially in hardware of a computing device to form a plurality of polar coordinate canvases by transforming original coordinates of the canvas into polar coordinates;
   a polar coordinate content aware fill module implemented at least partially in hardware of a computing device to fill the unfilled portion of respective ones of the plurality of polar coordinate canvases using a content-aware fill technique that is initialized based on the initially filled canvas;
   an original coordinate transformation module implemented at least partially in hardware to form a plurality of original coordinate canvas portions by transforming the polar coordinates of the filled plurality of polar coordinate canvases back into original coordinates; and
   a map generation module implemented at least partially in hardware of a computing device to generate an environmental map of the digital image by combining the plurality of original coordinate canvas portions.

16. In a digital medium environment to generate an environmental map of a digital image, a system comprising:
   means for scaling the digital image to achieve a target aspect ratio, the scaling based on a content aware scaling;
   means for generating a canvas that is dimensionally larger than the scaled digital image that includes the scaled digital image and an unfilled portion of the canvas;
   means for generating an initially filled canvas by filling the unfilled portion using a content aware fill technique based on the inserted digital image;
   means for forming a plurality of polar coordinate canvases by transforming original coordinates of the canvas into polar coordinates;
   means for filling the unfilled portion of respective ones of the plurality of polar coordinate canvases using a content-aware fill technique that is initialized based on the initially filled canvas;
   means for forming a plurality of original coordinate canvas portions by transforming the polar coordinates of the filled plurality of polar coordinate canvases back into original coordinates; and
   means for generating an environmental map of the digital image by combining the plurality of original coordinate canvas portions.

17. The system as described in claim 16, wherein the target aspect ratio is two to one, width to height.

18. The system as described in claim 16, further comprising means for reflecting portion of the digital image in the canvas.

19. The system as described in claim 16, wherein the canvas is twice as large, dimensionally, as the digital image.

20. The system as described in claim 16, wherein the original coordinates are defined based on a vertical axis and a horizontal axis.

* * * * *